United States Patent
Jeon et al.

(10) Patent No.: US 10,769,905 B2
(45) Date of Patent: Sep. 8, 2020

(54) INTERNET OF THINGS-BASED TRESPASSING SITUATIONS ANALYSIS SYSTEM FOR SMART WINDOW

(71) Applicant: NEOSTACK CO., LTD., Incheon-si (KR)

(72) Inventors: Jin Oh Jeon, Incheon-si (KR); Cheong Jin Ahn, Incheon-si (KR); Tae Geon Song, Incheon-si (KR); Mi Ran Lee, Incheon-si (KR)

(73) Assignee: NEOSTACK CO., LTD., Incheon-si (KR)

( * ) Notice: Subject to any disclaimer, the term of this patent is extended or adjusted under 35 U.S.C. 154(b) by 0 days.

(21) Appl. No.: 16/664,136

(22) Filed: Oct. 25, 2019

(65) Prior Publication Data
US 2020/0152025 A1    May 14, 2020

(30) Foreign Application Priority Data
Nov. 14, 2018   (KR) .......................... 10-2018-0139808

(51) Int. Cl.
| G08B 13/02 | (2006.01) |
| G08B 7/06  | (2006.01) |
| H04L 29/08 | (2006.01) |

(52) U.S. Cl.
CPC ............... G08B 13/02 (2013.01); G08B 7/06 (2013.01); H04L 67/12 (2013.01)

(58) Field of Classification Search
None
See application file for complete search history.

(56) References Cited

U.S. PATENT DOCUMENTS

2004/0124972 A1*  7/2004  Strzelczyk ........... G08B 13/183
                                                        340/426.27

FOREIGN PATENT DOCUMENTS

| JP | 2006-053778 A    | 2/2006  |
| KR | 10-2000-0037017 A | 7/2000  |
| KR | 10-1739724 B1    | 5/2017  |
| KR | 10-1796247 B1    | 11/2017 |
| KR | 10-1855320 B1    | 5/2018  |
| KR | 10-1878709 B1    | 8/2018  |

* cited by examiner

*Primary Examiner* — Carlos Garcia
(74) *Attorney, Agent, or Firm* — Studebaker & Brackett PC

(57) ABSTRACT

An Internet-of-things (IoT)-based impact pattern analysis system for a smart security window includes: an ultra-small IoT device attached to a security window and detecting an impact; a station processing a signal obtained from the ultra-small IoT device and analyzing an impact pattern; and a user terminal outputting information related to the impact pattern through an interface. The station controller processes 3-axis acceleration data to extract a feature vector and determines an impact pattern by applying a learning model. According to the embodiment of the present disclosure, by automatically determining whether an intrusion occurs by analyzing impact patterns according to various conditions and circumstances, malfunction based on an impact other than an intrusion may be reduced and an unnecessary alarm may be prevented.

9 Claims, 8 Drawing Sheets

INTERNET OF THINGS-BASED TRESPASSING SITUATIONS ANALYSIS SYSTEM FOR SMART WINDOW

CROSS-REFERENCE TO RELATED APPLICATIONS

The present application claims the benefit of priority to Korean Patent Application No. 10-2018-0139808 filed on Nov. 14, 2018. The disclosure of the above-listed application is hereby incorporated by reference herein in their entirety.

BACKGROUND

1. Field

The present disclosure relates to an Internet-of-things (IoT)-based trespassing situations analysis system for a smart security window, and more specifically, to an IoT-based impact pattern analysis system which detects an impact applied to a security window using an ultra-small IoT device equipped with an acceleration sensor and analyzes various trespassing situations by applying a signal processing method and a machine learning method to acceleration data to determine whether an intrusion occurs.

2. Description of Related Art

With the development of the IoT, an interest in smart security window has recently been increased as a way to prevent crime of housebreaking. The smart security window is a self-security technology of detecting housebreaking and trespassing of a stranger by attaching a sensor configured to sense an intrusion to a window frame or a window and periodically monitoring by a user through a personal computer (PC) or a mobile application.

Various sensors such as an infrared sensor, an acceleration sensor, a vibration sensor, a magnetic sensor, a pressure sensor, and the like are applied to and used in the smart security window. However, the smart security window using such sensors merely detects an intrusion by determining the presence or absence of an impact in a dichotomous way, without supporting a technology of recognizing a specific situation. For example, if a sensor is operated due to an indirect impact applied to the window or the window frame by the wind, not by an impact of an external intrusion, it may be known to the user as 'impact detection' but it is not an impact due to 'intrusion', increasing a malfunction rate. In addition, if an impact is applied to the window or the window frame by mistake, it may also be detected as an impact and wrong information may be delivered to the user.

Therefore, an artificial intelligent technology may be integrated to determine "wind" in the case of detecting an impact by the wind, "mistake" in the case of detecting an impact by mistake, and "intrusion" in the case of detecting an impact due to trespassing of an external intruder, and in particular, in various conditions and circumstances such as a case of scratching the window by a knife or a saw, a case of striking the window by a hammer or hand, and the like. That is, the importance of a smart security window technology including an enhanced artificial intelligence method has emerged.

RELATED ART DOCUMENTS

Patent Documents (Patent document 0001) KR 10-1796247
(Patent document 0001) KR 10-1855320

SUMMARY

An aspect of the present disclosure may provide an Internet-of-things (IoT)-based trespassing situations analysis system for a smart security window, which includes an ultra-small IoT device for enhancing utilization of a space and ease and which processes an acceleration signal obtained from the ultra-small IoT device, applies a machine learning method to the acceleration signal, and analyses trespassing situations according to various conditions and circumstances to determine whether an intrusion occurs.

Another aspect of the present disclosure may provide an IoT-based trespassing situations analysis system for a smart security window, which provides information related to an analyzed trespassing situations to a user through a mobile application and provides a captured image to the user by controlling a security camera and a lighting device through a home network if an intrusion is determined.

According to an aspect of the present disclosure, an Internet-of-things (IoT)-based trespassing situations analysis system for a smart security window includes: an ultra-small IoT device attached to a security window and detecting a trespassing; a station processing a signal obtained from the ultra-small IoT device and analyzing a trespassing situations; and a user terminal connected to the station via a network and outputting information related to the trespassing situations through an interface, wherein the ultra-small IoT device includes: an acceleration sensor detecting a trespassing applied to the security window; and an ultra-small IoT controller transmitting 3-axis acceleration data obtained from the acceleration sensor to the station, and the station includes a station controller including a signal processing module processing the 3-axis acceleration data and extracting a feature vector and a classification module generating a learning model on the basis of the feature vector and determining an trespassing situations, and determining whether an intrusion occurs on the basis of the trespassing situations.

In an embodiment, the signal processing module may include: an acceleration signal processing unit obtaining a signal magnitude area (SMA) signal on the basis of the three-axis acceleration data; a noise canceling unit canceling noise from the SMA signal; an impact signal by trespassing detecting unit calculating a threshold on the basis of the noise-canceled signal and a predetermined sensitivity a and obtaining a trespassing signal on the basis of the threshold; and a feature vector extracting unit extracting a feature vector from the trespassing signal, and the classification module may include: a learning model generating unit generating a learning model related to the impact pattern on the basis of the extracted feature vector; and an trespassing situations determining unit determining a trespassing situations on the basis of the learning model.

In an embodiment, the learning model related to the trespassing situations may include an trespassing model (P-Model) applied by a hand, an trespassing model (H-Model) applied by a hammer, a model (K-Model) in which a security window is scratched by a knife, and a model (S-Model) in which a security window is shaken by a hand.

In an embodiment, the user terminal may be configured to set a predetermined sensitivity (α) via an interface and transmit a control signal to the station via a network.

In an embodiment, the feature vector extracting unit may extract the feature vector by calculating an average, a deviation, a root mean square (RMS), a skewness, a kurtosis, and a dominant frequency (DF) of the impact signal, and the learning model generating unit may improve accuracy of the trespassing situations analysis by reducing a dimension by applying a principal component analysis (PCA) to the feature vector.

In an embodiment, the ultra-small IoT device may further include an ultra-small IoT alarm unit calculating an impact amount by trespassing on the basis of the three-axis acceleration data and outputting LED light or a sound when the impact amount by trespassing is greater than or equal to a threshold.

In an embodiment, the station may further include a station alarm unit outputting LED light or a sound when it is determined that an intrusion occurs.

In an embodiment, the system may further include: a security camera or a lighting device connected to the station and the user terminal via a network, wherein the security camera or the lighting device may be automatically controlled by a control signal received from the station or may be controlled by a control signal received from the user terminal according to whether an intrusion occurs.

According to another aspect of the present disclosure, an Internet-of-things (IoT)-based trespassing situations analysis method for a smart security window, performed by a computer processor, includes: receiving 3-axis acceleration data from an acceleration sensor attached to the security window; obtaining a signal magnitude area (SMA) signal on the basis of the 3-axis acceleration data; canceling noise from the SMA signal; calculating a threshold on the basis of the noise-canceled SMA signal and a predetermined sensitivity α and obtaining an impact signal by trespassing on the basis of the threshold; extracting a feature vector from the impact signal; generating a learning model related to the trespassing situations on the basis of the extracted feature vector; determining the trespassing situations on the basis of the feature vector and the learning model; determining whether an intrusion occurs on the basis of the trespassing situations; and transmitting the trespassing situations and information related to the intrusion to a user terminal via a network.

According to another aspect of the present disclosure, a computer program store in a computer-readable recording medium for implementing the Internet-of-things (IoT)-based trespassing situations analysis method for a smart security window.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
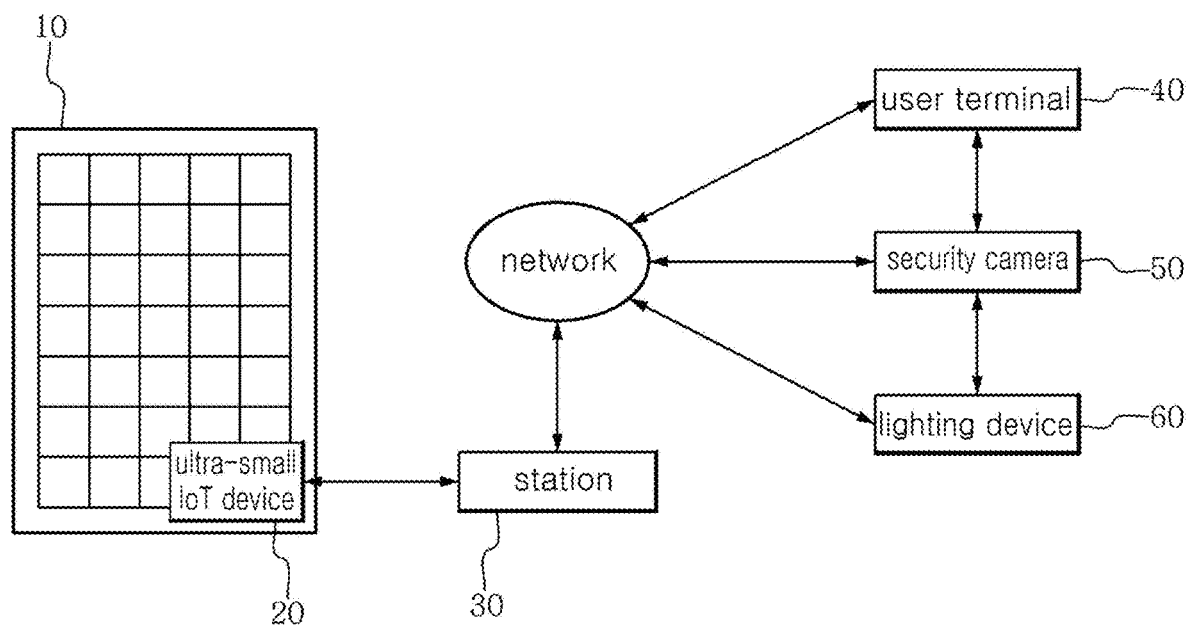
FIG. 1 is a block diagram of an Internet of things (IoT)-based trespassing situations analysis system for a smart security window according to an embodiment.

Hereinafter, although the embodiments of the present disclosure will be described in detail with reference to the accompanying drawings and the contents illustrated in the drawings, it is to be understood that claims of the present disclosure are not limited by such embodiments.

Terms used in present specification are general terms selected in consideration of functions and widely used at the present time. However, such terms may vary depending upon intentions of those skilled in the art to which the present specification pertains, usual practices, or appearance of new technology. In a specific case, some terms may be selected by the applicant of the present application, hi this case, meanings of such terms will be described in corresponding paragraphs of present specification. Therefore, it should be noted that terms used in present specification be interpreted based on real meanings of the terms and the present specification, not simple names of the terms.

The embodiments described herein may have the aspect of being fully hardware, partially hardware and partially software or fully software. In this disclosure, "unit", "module" "device", "server", "system", or the like designate a computer-related entity such as hardware, a combination of hardware and software, or software. For example, "unit", "module", "device", "server", or "system" may designate hardware configuring a portion or the entirety of a platform and/or software such as an application for driving the hardware.

The embodiments of the present disclosure will be described in detail with reference to the accompanying drawings.

FIG. 1 is a system diagram showing a configuration of an Internet of things (IoT)-based trespassing situations analysis system for a smart security window according to an embodiment.

Referring to FIG. 1, the system according to an embodiment of the present disclosure includes an ultra-small IoT device 20 attached to a security window 10 to detect an trespassing, a station 30 processing a signal obtained from the ultra-small IoT device 20 and analyzing an trespassing situations, a user terminal 40 connected to the station 40 via a network and outputting information related to the trespassing situations through an interface, and a security camera 50 and a lighting device 60 connected to the station 30 and the user terminal 40 via the network.

The security window 10, which is an access space through which an outsider tries to trespass on a house or a building, includes any type of door such as gate or the like, as well as a window. In the present disclosure, a height, width, breadth, and the like of the security window 10 is not limited.

The ultra-small IoT device 20 is attached to the security window 10 to detect an impact by trespassing from the outside and includes a sensor for detecting a change in state when an impact by trespassing is applied to the security window 10. The ultra-small IoT device 20 is manufactured to be small so as to be easily attached and detached and includes ultra-small sensors.

Figure 2:
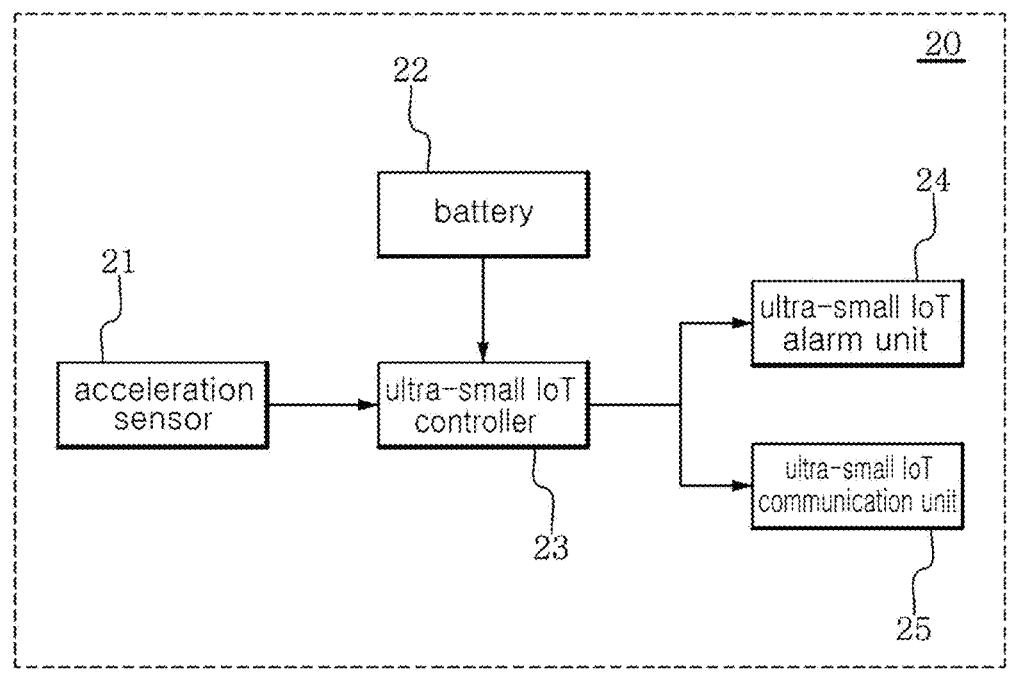
FIG. 2 is a block diagram illustrating a configuration of an ultra-small IoT device according to an embodiment.

A configuration of the ultra-small IoT device 20 will be described in detail with reference to FIG. 2. The ultra-small IoT device 20 includes an acceleration sensor 21 for detecting an trespassing applied to the security window 10, a battery 22 supplying electric power to the device, an ultra-small IoT controller for processing 3-axis acceleration data obtained from the acceleration sensor 21, an ultra-small IoT alarm unit 24 for detecting an external intrusion according to a result of processing the acceleration data and primarily informing about the external intrusion, and an ultra-small IoT communication unit 25 for transmitting the result of processing the data to the station 30.

The acceleration sensor 21 obtains 3-axis (x, y, z-axis) data by detecting movement based on an impact applied to the security window 10. The three-axis acceleration data obtained by the acceleration sensor 21 is processed by the controller 23 and used for analyzing an trespassing situations and determining whether an intrusion occurs. Various sensors such as a vibration sensor, a magnetic sensor, and an infrared sensor may be used for trespassing detection, and in the present embodiment, the acceleration sensor is used to minimize a size of the IoT device, maximize trespassing situations recognition accuracy, and increase a price/performance ratio.

The ultra-small IoT controller 23 is configured as a processor for processing data obtained from the acceleration sensor and transmitting the processed data to the station 30 or receiving a control signal from the outside and generally controlling the ultra-small IoT device 20. In addition, the ultra-small IoT controller 23 may calculate an amount of impact by trespassing on the basis of the acceleration data, and if an intrusion is determined as the amount of impact by trespassing exceeds a threshold, the ultra-small IoT controller 23 may primarily control the alarm unit 24 to inform the user about the intrusion.

The ultra-small IoT controller 23 includes a microprocessor unit that provides a Bluetooth low energy (BLE) communication function. For example, the microprocessor unit may include a CSR1010 BLE MCU (Qualcomm, Calif., USA) or the like. This component may provide functionality required for manufacturing a BLE product with RF and Bluetooth 4.1 specification in a single IC.

In an embodiment, the ultra-small IoT controller 23 calculates an amount of impact by trespassing from the data obtained from the acceleration sensor 21. If the amount of impact by trespassing is equal to or greater than a specific threshold, the ultra-small IoT controller 23 determines an intrusion and causes the ultra-small IoT alarm unit 24 to give a primary warning. Here, the data obtained from the acceleration sensor 21 is raw data, and the presence or absence of an intrusion may be determined in a dichotomous way.

For example, when an impact is applied to the security window 10, the impact may be detected by the acceleration sensor 21 mounted on the ultra-small IoT device 20 and a magnitude of acceleration data as much as detected may be measured. If the magnitude of the acceleration data, that is, a magnitude of the amount of impact by trespassing, exceeds a threshold (which may be set by a developer or the user), the ultra-small IoT alarm unit 24 operates. As in a signal processing method described later, the three-axis acceleration data may be converted into a signal magnitude area (SMA) value to indicate an index of the amount of impact by trespassing.

The ultra-small IoT communication unit 25 serves to perform wireless communication with a station alarm unit 35 provided in the station 30. The ultra-small IoT communication unit 25 may transmit and receive data via serial communication, such as Bluetooth, Wi-Fi, radio frequency (RF) or I2C.

In an embodiment, the station 30 and the ultra-small IoT device 20 may establish a mesh network in which each node forms a network like a mesh by N:M. When the mesh network is established, a short-range wireless network such as Bluetooth or ZigBee may be significantly expanded, and even if a node fails, the wireless network may be maintained through the other nodes, thereby increasing fault tolerance.

Figure 3:
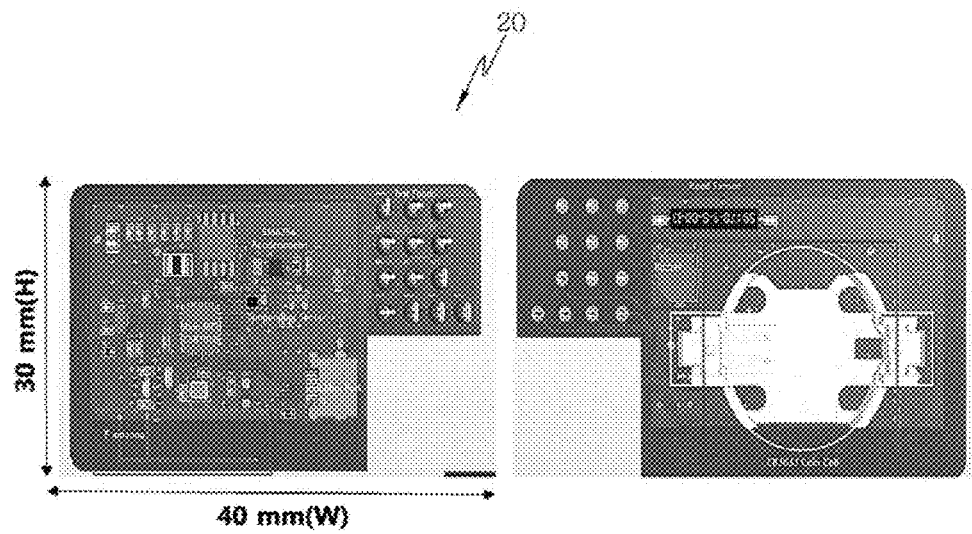
FIG. 3 is a diagram illustrating a sensor configuration of an ultra-small IoT device according to an embodiment.

As shown in FIG. 3, the ultra-small IoT device 20 according to the present disclosure may be designed to be very small so as to be easily detached, minimize the influence of measured values, and maximize utilization of space. For example, the ultra-small IoT device 20 may have a size of 40 mm in width and 30 mm in height, may be set according to a size of a coin cell battery 22 to include small sensors to limit the size. However, the structure and size of FIG. 3 is merely illustrative and is not limited thereto.

The station 30 receives the 3-axis acceleration data from the ultra-small IoT device 20, processes the data according to a signal processing method, analyzes an trespassing situations based on various circumstances and conditions by utilizing a machine learning technique on the basis of a defined learning model, and transmits information related to the analyzed trespassing situations to the user terminal 40.

Figure 4:
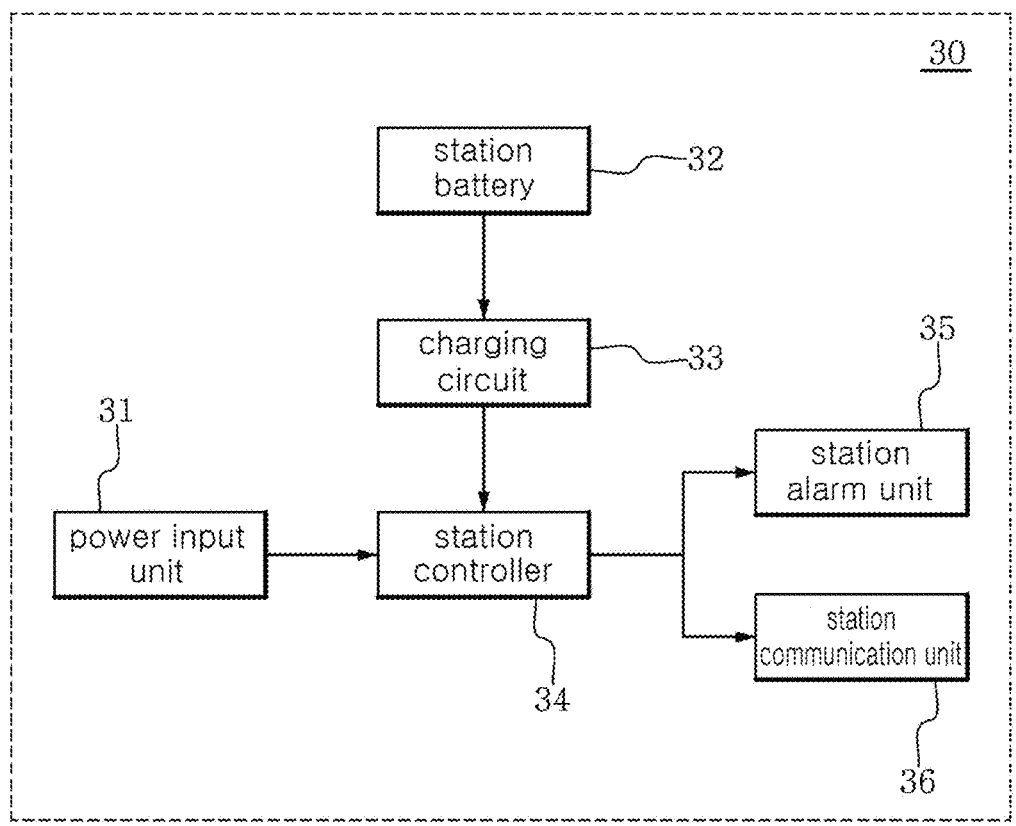
FIG. 4 is a block diagram illustrating a configuration of a station according to an embodiment.
Figure 5:
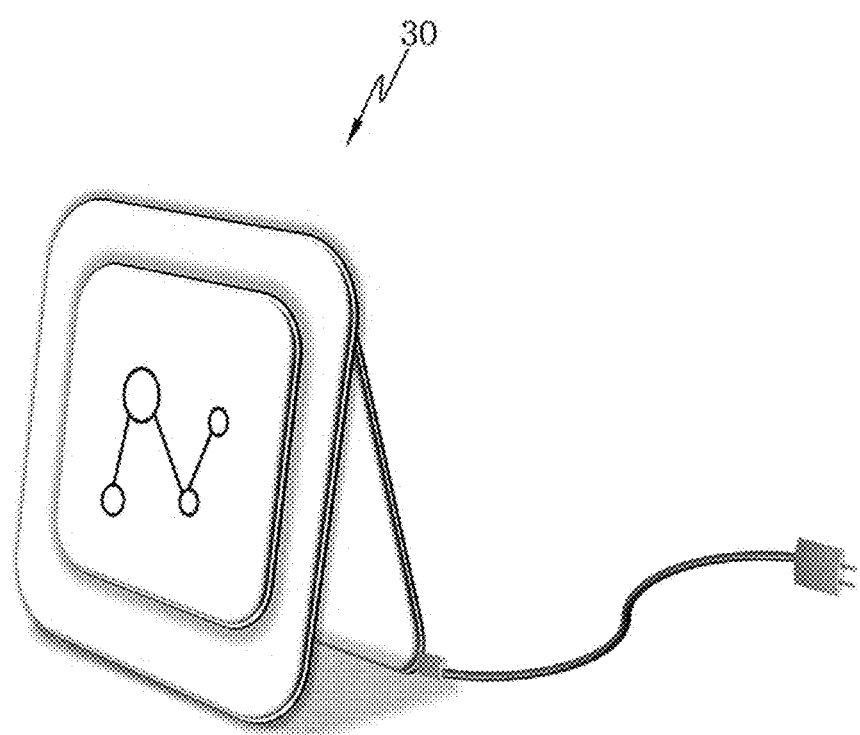
FIG. 5 is a view illustrating an exterior design of a station device according to an embodiment.

FIG. 4 is a block diagram illustrating components of a station according to an embodiment. The station 30 is driven using a power input unit 31, a station battery 32, and a charging circuit 33 for charging the battery 32 with commercial power and includes a station controller 34 for processing a signal received from the ultra-small IoT device and analyzing an trespassing situations, a station alarm unit 35 for notifying the user about whether an intrusion occurs according to the analyzed trespassing situations, and a station communication unit 36 for receiving a signal from the IoT device and transmitting an analysis result to the user terminal or another device. FIG. 5 illustrates an exterior design of a station device according to an embodiment. However, the design is illustrative only and is not limited to any particular shape or size.

The power input unit 31 receives commercial power and supplies electric power to the station. The station battery 32 is a rechargeable battery which is charged through the charging circuit 32 upon receiving commercial power from the power input unit 46. Alternatively, other elements may be provided with power directly from a commercial power source.

Figure 6:
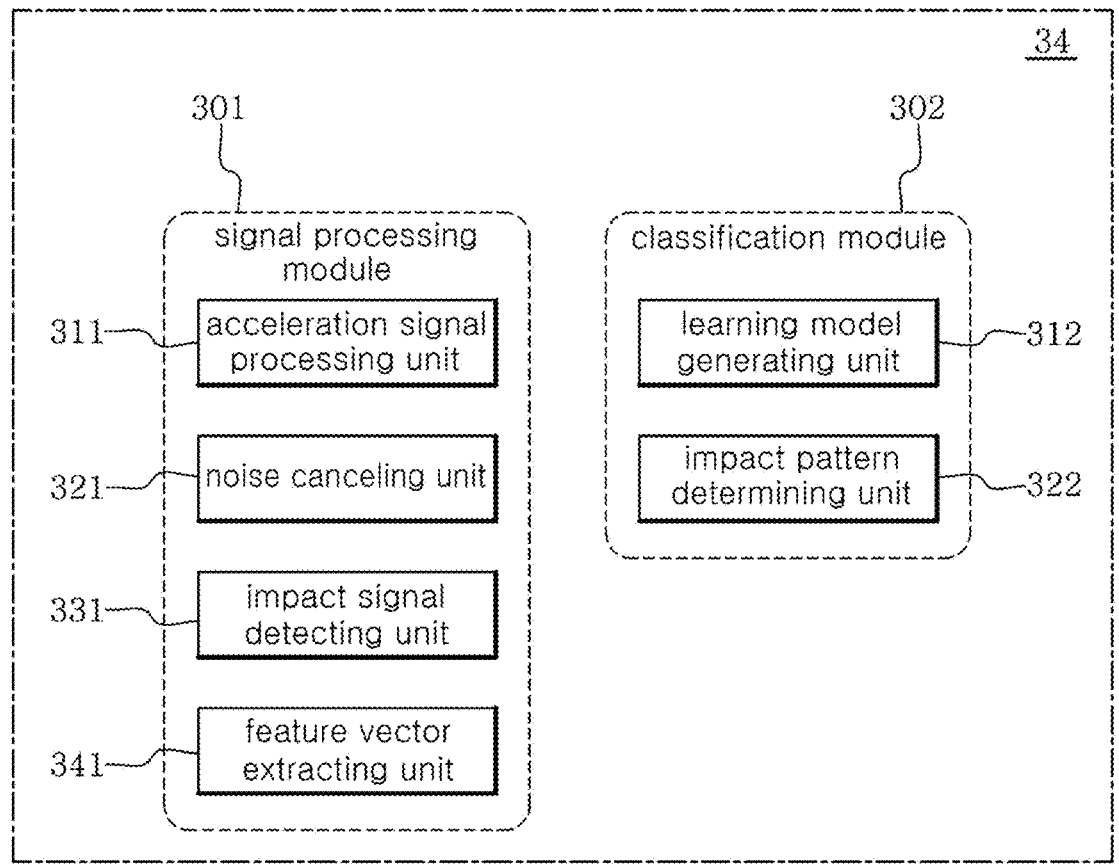
FIG. 6 is a block diagram illustrating a configuration of a signal processing module and a classification module according to an embodiment.

Referring to FIG. 6, the station controller 34 may include a signal processing module 301 and a classification module 302 to analyze an trespassing situations and determine whether an intrusion occurs.

The signal processing module 301 extracts a feature vector by processing the 3-axis acceleration data obtained through the ultra-small IoT device 20, and the classification module 302 serves to generate a learning model on the basis of the feature vector and determine the trespassing situations.

Hereinafter, a way in which each component processes a signal and data to analyze an trespassing situations will be described in detail.

Referring to FIG. 6, the signal processing module 301 includes an acceleration signal processing unit 311, a noise canceling unit 321, an trespassing wave detecting unit 331, and a feature vector extracting unit 341, and the classification module 302 may include a learning model generating unit 312 and an trespassing situations determining unit 322.

The acceleration signal processing unit 311 processes the three-axis (x, y, z-axis) acceleration data obtained from the acceleration sensor 21 included in the ultra-small IoT device 20. In an embodiment, the 3-axis acceleration data is converted into a signal magnitude area (SMA) value. The SMA is to express a size of the three axes in one dimension, and an equation for obtaining the SMA is shown in Equation 1.

$$SMA_n = \frac{1}{t}\left(\int_0^t |x(t)|\,dt + \int_0^t |y(t)|\,dt + \int_0^t |z(t)|\,dt\right) \quad \text{[Equation 1]}$$

Here, n denotes each input signal, x(t), y(t), and z(t) denote the three-axis data signal of acceleration.

Next, the noise canceling unit 321 is to cancel power noise, white noise, etc. of the calculated SMA signal. For example, the noise canceling unit 321 may cancel noise by applying a low-pass filter (cut-off frequency: 10 Hz).

Figure 7:
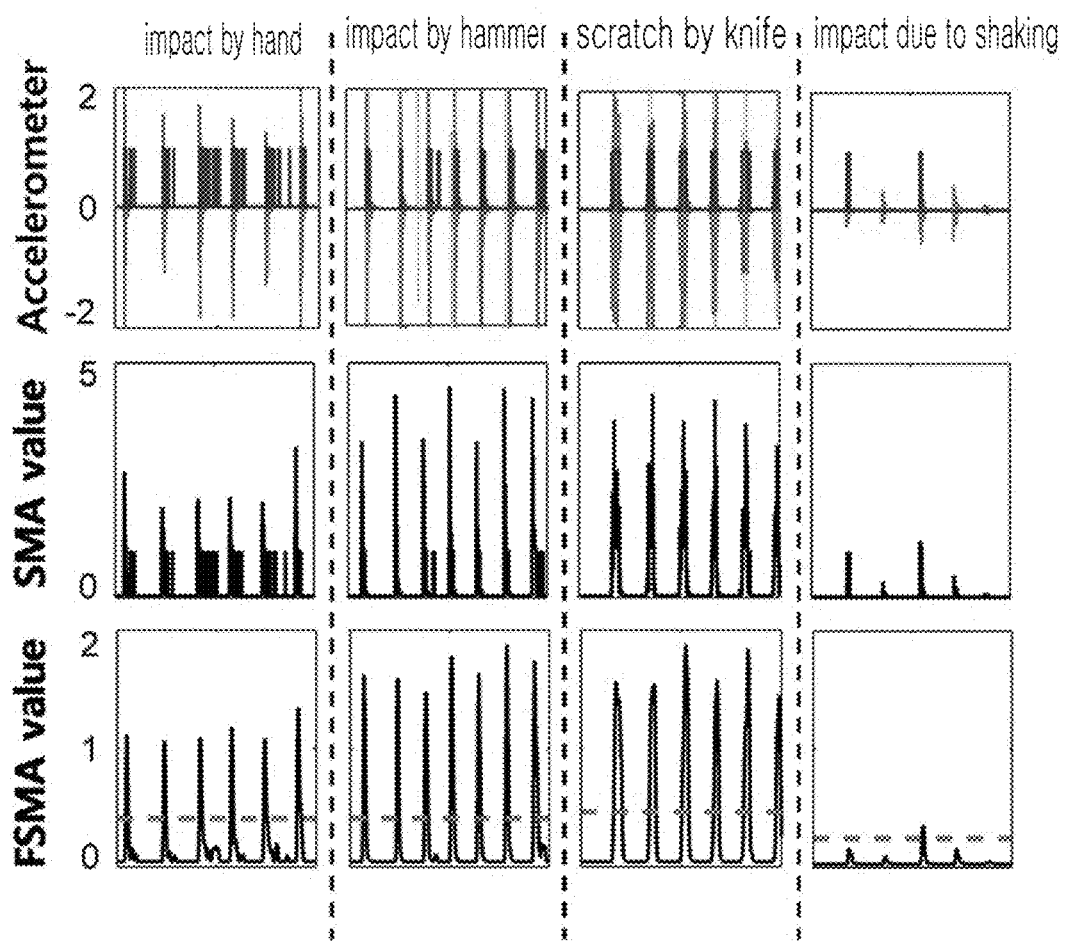
FIG. 7 is a graph illustrating results of processing signals regarding various trespassing situations according to an embodiment.

FIG. 7 is a graph illustrating results of processing signals regarding various trespassing situations. The graph of FIG. 7 shows results (SMA value) of performing SMA signal processing on input acceleration signals (accelerometer) by the acceleration signal processing unit 311 and results (FSMA value) of canceling noise by the noise canceling unit 321 in each circumstance (multiple conditions and circumstances regarding a trespassing situation applied to the security window by a hand, a trespassing applied to the security window by a hammer, a trespassing of scratching the security window by a knife, a trespassing of shaking a window frame of the security window by a hand).

The impact signal by trespassing detecting unit 331 detects an impact signal by processing the FSMA signal from which noise was canceled. The impact signal detecting unit 331 extracts a portion exceeding a predetermined threshold from the FSMA signal to distinguish a signal according to an actual trespassing from an unnecessary signal, and when it is determined that a certain trespassing situation has occurred, the trespassing signal detecting unit 331 serves to operate the classification module 302.

Figure 8:
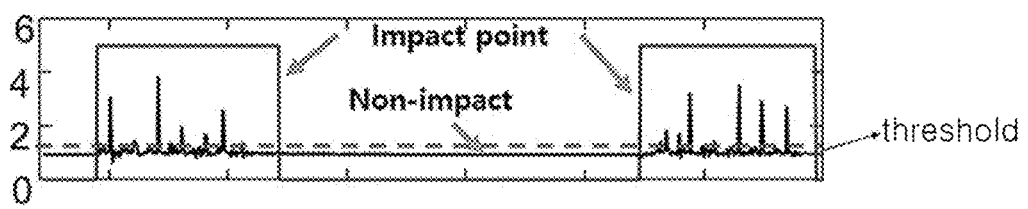
FIG. 8 is a graph illustrating an impact signal processed by a signal processing module according to an embodiment.

FIG. 8 is a graph illustrating an trespassing signal processed by the signal processing module 301 according to an embodiment. The trespassing signal detecting unit 331 provides a function for the developer to set a specific threshold in advance and adjust a sensitivity value continuously. The threshold Thr is calculated using Equation 2.

$$Thr = \frac{\sum_{i=1}^{p} fsma_i}{p} + \alpha \quad \text{[Equation 2]}$$

In Equation 2, fsma denotes a signal obtained by canceling noise from the SMA described above, p denotes a reference value (baseline) of the input signal which indicates a magnitude of a value of an initial state without an trespassing situation, and α denotes sensitivity. Sensitivity of trespassing wave detection may be controlled by adjusting α. If the user wants to reduce malfunction of the system due to trespassing situations (wind or rainfall) and not external intrusion, the value of α may be increased, and if the user wants the system to respond sensitively to even small impact, the value of a may be adjusted to be reduced so as to be sensitive to an impact signal.

Figure 9:
FIG. 9 is a diagram illustrating a function of an application for setting a sensitivity of impact detection according to an embodiment.

FIG. 9 shows an embodiment of an application function that may adjust sensitivity of the trespassing signal detecting unit 331, in which the developer may previously set sensitivity or the user may directly adjust the sensitivity to respond to various circumstances and variables. As illustrated, the user may set different sensitivity of processing a signal received by the ultra-small IoT device installed in each room through the terminal.

For example, in a child room (α=0.8) which is set to have a lower sensitivity than a main room (α=1.2) having a high sensitivity, a threshold for trespassing signal detection is set to be low, and thus, it respond to be more sensitive to even an trespassing signal having a small amplitude. The sensitivity may be set to be different depending on a location of the security window (e.g., a security window installed in a direction of heavy wind or rain) and security needs. In addition, whether the alarm is turned on or off for the generation of the trespassing signal may be set to be different.

Referring back to FIG. 6, the signal processing module 301 includes a feature vector extracting unit 341 for extracting a feature vector from the trespassing signal. According to an embodiment, the feature vector extracting unit 341 may extract the feature vector by applying a signal processing function to the trespassing signal. For example, the signal processing function extracts the feature vector by calculating an average, a deviation, a root mean square (RMS), a skewness, a kurtosis, and a dominant frequency (DF) of the trespassing signal. The extracted feature vector data is transmitted to the classification module 302 and used for analysis of the trespassing situations.

Referring to FIG. 6, the classification module 302 may include a learning model generating unit 312 and an trespassing situations determining unit 322. According to an embodiment, the learning model generating unit 312 may include a trespassing model (P-Model) applied by a hand, a trespassing model (H-Model) applied by a hammer, a model (K-Model) of scratching the security window with a knife, a model (S-Model) of shaking the security window by a hand, and the like. In addition, a model including environmental factors such as wind, rain, and hail may be generated, and learning models of various conditions such as a case where the window is kicked by a foot or a case where the security window is touched by mistake may also be included, without being limited only to the situation of classifying the patterns of P-Model, H-Model, K-Model, and S Model described above. The trespassing situations learning algorithm may include a pre-modeled learning algorithm to process data under various conditions and circumstances to recognize an trespassing situations.

Figure 10:
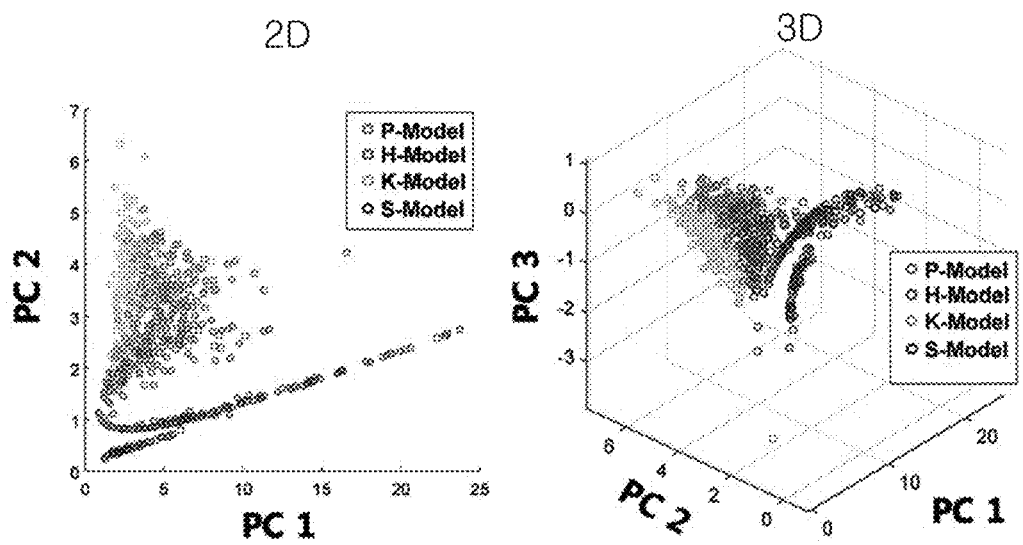
FIG. 10 is a graph illustrating a reduction of feature dimensions by applying a principal component analysis (PCA) to a feature vector according to an embodiment.

The learning model generating unit 312 first receives a value of the feature vector (; n is a sample size, 6 is a size of the feature extracting method) which is data finally processed in the signal processing module 301. The input feature vector reduces a dimension of the feature vector through principal component analysis (PCA). FIG. 10 is an exemplary graph of feature dimension reduction using the PCA according to an embodiment of the present disclosure.

Thus, a calculation rate of classifying patterns may be improved by reducing the feature dimension and final classification accuracy may be improved by increasing correlation between features by projecting correlated feature vectors to the same axis. According to an embodiment of the present disclosure, the feature vector extracted by the feature vector extracting unit 341 may include one-dimensional, two-dimensional, three-dimensional, four-dimensional, and five-dimensional feature vectors having reduced dimensions through the PCA.

The trespassing situations determining unit 322 analyzes an trespassing situations by performing learning on the basis of the learning model. The trespassing situations determining unit 322 compares signal features of the classified trespassing models (P-Model, H-Model, K-Model, S-Model, etc.) with features of a currently input signal to determine an trespassing situations. The trespassing situations determining unit 322 generates or updates pattern setting data according to the learning results and transmits the generated or updated pattern setting data to the ultra-small IoT device controller 23 and/or the station controller 34 to set pattern analysis using the pattern setting data. The ultra-small IoT device controller 23 and/or the station controller 34 may update the pattern setting data by performing learning with the added learning data.

The processor generates a plurality of classifiers by combining a signal processing function and a signal channel and tests performance of each classifier to select high-rank classifiers having best performance. The selected classifiers are generated or updated with the pattern setting data.

In other words, the processor continuously trains the classifiers and trains the classifiers for each of the plurality of signal processing functions. If the best signal processing function and classifier are selected, the corresponding signal processing function and classifier are used. Therefore, the signal processing function and the classifier used by the processor may be changed, and a function constantly changed to suit the user's circumstance is implemented.

When the user wants to update state information, automatic updating and manual updating are provided. In the case of automatic updating, a pattern in a recognized state is continuously added to reference state information. If an erroneous detection occurs during this process, a subject may indicate that the corresponding state is erroneous detection, thereby adding information on a corresponding event to the reference state information to enhance a positive detection rate. In the case of manual updating, the subject selects an event (occurrence of an impact due to wind or rainfall), specifies a state, and adjusts a threshold and a measurement value of the pattern to update the reference state information. Therefore, the state information changes flexibly to suit the user's circumstance.

The station controller 34 determines whether an intrusion occurs on the basis of the analyzed trespassing situations. For example, if the trespassing situations is a trespassing situations due to a behavior of an external intruder such as the trespassing model (P-Model) applied by a hand, the trespassing model (H-Model) applied by a hammer, the model (K-Model) of scratching the window with a knife, and the model (S-Model) of shaking the window by a hand, the station controller 34 may determine that it is an "intrusion situation" and provide corresponding information to the user terminal 40 or operate the security camera 50 or the lighting device 60. On the contrary, if an trespassing detection occurs due to shaking based on strong wind or rainfall, the station controller 34 may determine that it is not an intrusion situation and update the pattern information through a learning model, without transmitting data to an external device such as the user terminal.

Referring back to FIG. 4, if the station controller 34 determines the intrusion situation as a result of analyzing the trespassing situations, the station controller 34 may control the station alarm unit 35 to output LED light or a warning sound to inform about the intrusion and simultaneously (or separately) transmit information related to the trespassing situations to the user terminal 40 through the station communication unit 36.

The user terminal 40 is a device configured to receive an alarm regarding an intrusion from the station 30 and receive the results and information of the trespassing situations analyzed in the station 30 so that the user may monitor or control directly. The user terminal 40 may include any types of terminal device capable of monitoring related information through a display such as a smartphone, a laptop computer, a desktop computer, a table PC, or the like, and controlling related devices through an application.

When the user receives an alarm for an unnecessary intrusion from the trespassing situations results provided through the user terminal 40, the user may ignore the alarm or may perform a function of blocking the alarm if the user does not want to receive the alarm regarding the unnecessary intrusion any longer. Further, the user may set sensitivity regarding the IoT device as descried above.

The security camera 50 and the lighting device 60 may include a home IoT device capable of communicating with the station 30 in a state where a home network is established. In an embodiment, if a result of a definite 'intrusion' is provided from the ultra-small IoT device 20 or station 30, the security camera 50 and the lighting device 60 are activated to increase the intensity of illumination using the lighting device 60 in a room or near a security window where the intrusion is detected, and an image of the corresponding situation is captured with the security camera 50 and transmitted through the user terminal 40 so that the user may check the situation by naked eyes. Alternatively, after the user receives the information about the intrusion through the terminal 40, the user may manually control the security camera 50 and the lighting device 60 connected through the network using an application.

Figure 11:
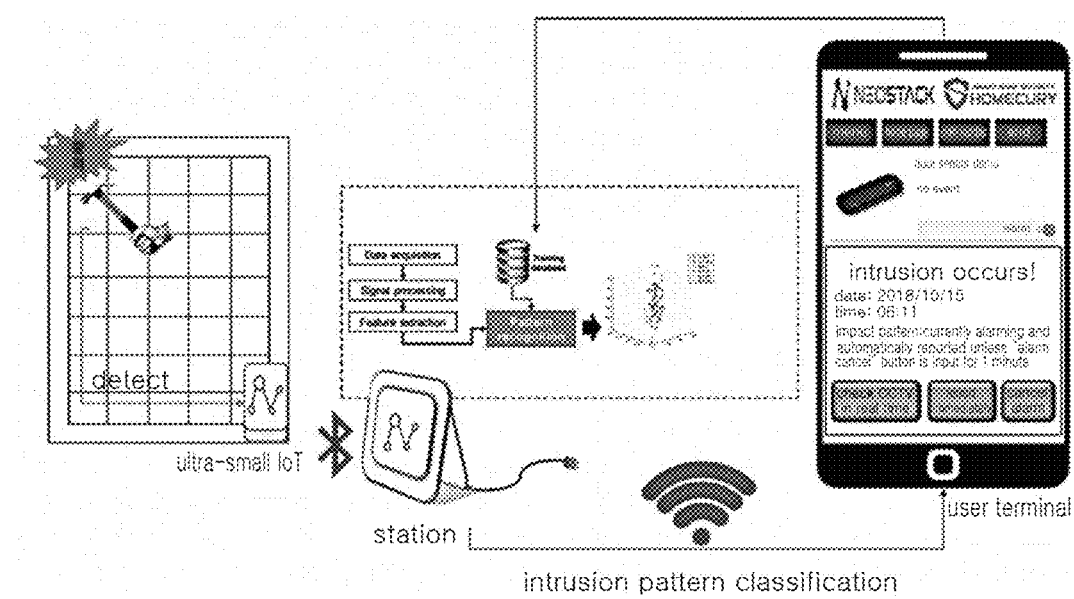
FIG. 11 is a diagram illustrating a simulation of an IoT-based security system according to an embodiment.

FIG. 11 is a diagram illustrating a simulation of an IoT-based security system according to an embodiment. Referring to FIG. 11, an application driven in the user terminal (smartphone) may provide a service interworking in an intrusion situation. For example, if the trespassing situations (H-Model) by a hammer is detected according to results of analyzing acceleration data of the ultra-small IoT device, it is determined that an intrusion situation occurs and the station controller transmits a data signal to the user terminal.

The application of the user terminal may output a warning sentence such as "intrusion situation occurs!", a date and time at which the intrusion occurs, and information regarding the trespassing situations such as "trespassing situations: trespassing applied by a hammer" on a display. In addition, the security camera connected to the network may be operated if a "real time CCTV check button" is touched, a phone may be connected to the police station or intrusion information may be transmitted to the police station if an "immediate report" button is touched, and an alarm operation of the application of the user terminal and the station alarm unit may be stopped if an "alarm cancel" button is touched.

Figure 12:
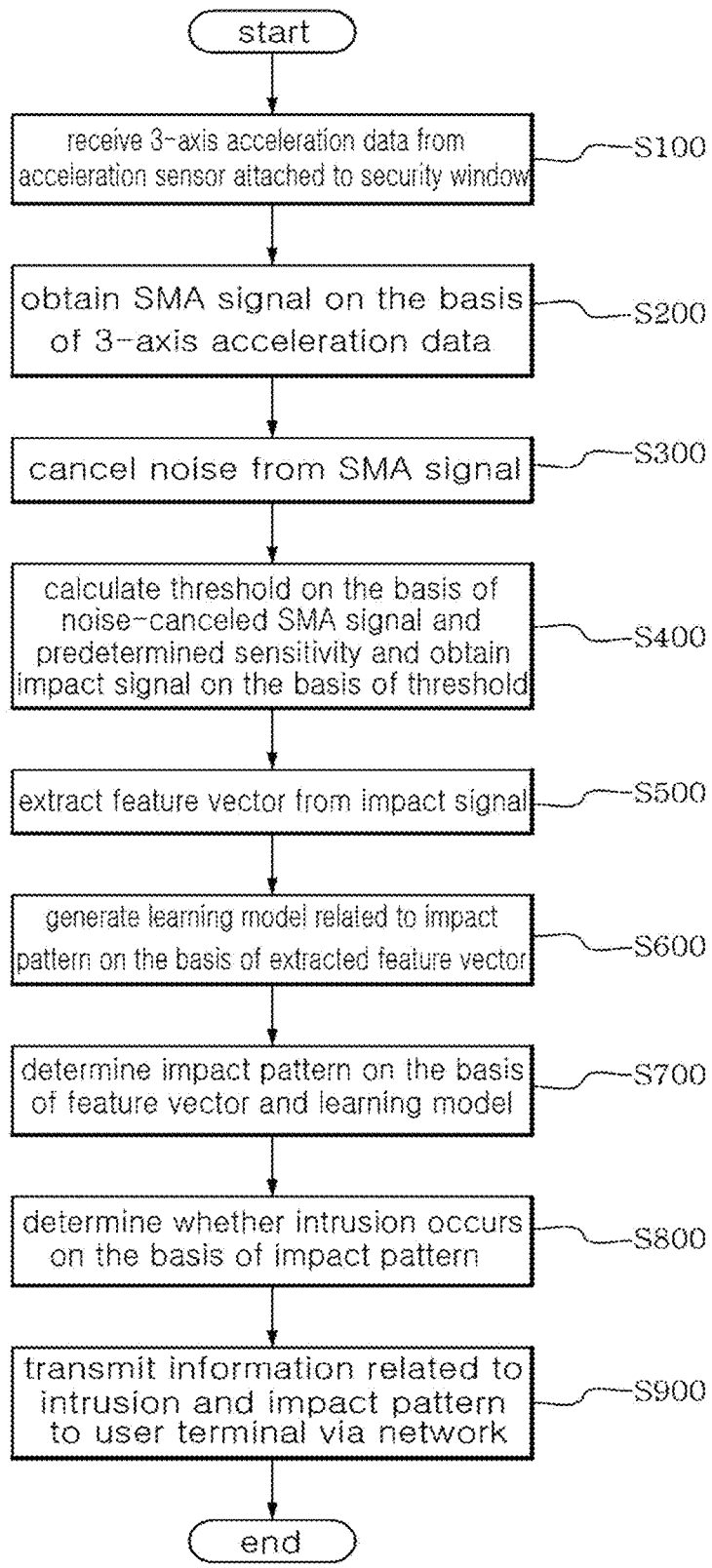
FIG. 12 is a flowchart illustrating a method of analyzing an IoT-based trespassing situations for a smart security window according to an embodiment.

FIG. 12 is a flowchart illustrating an IoT-based trespassing situations analysis method for a smart security window according to an embodiment. The trespassing situations analysis method according to the embodiment may be performed by a controller including a processor unit, and the method may include the following steps.

S100: receiving the three-axis acceleration data from the acceleration sensor attached to the security window;

S200: obtaining a signal magnitude area (SMA) signal on the basis of the three-axis acceleration data;

S300: canceling noise from the SMA signal;

S400: calculating a threshold on the basis of the noise-canceled SMA signal and a predetermined sensitivity α and obtaining an impact signal by trespassing on the basis of the threshold;

S500: extracting a feature vector from the impact signal by trespassing;

S600: generating a learning model related to an trespassing situations on the basis of the extracted feature vector;

S700: determining the trespassing situationson the basis of the feature vector and the learning model;

S800: determining whether an intrusion occurs on the basis of the trespassing situations; and S900: transmitting information related to the trespassing situations and intrusion to the user terminal via a network.

If a situation is determined as an intrusion situation after step S800, the process proceeds to step S900, and if the situation is not determined as the intrusion situation, the process returns to step S100 to continue monitoring. As described above, the learning model may be updated by data input by the user or automatically extracted after step S99, thereby improving accuracy.

The IoT-based trespassing situations analysis method according to an embodiment may be implemented in the form of program instructions that may be implemented by an application or executed through various computer components and recorded on a computer-readable recording medium. The computer-readable recording medium may include program instructions, data files, data structures, etc., alone or in combination.

Examples of computer-readable recording medium includes hardware devices specially configured to store and perform program instructions such as a magnetic medium such as a hard disk, a floppy disk, and a magnetic tape, an optical recording medium such as a CD-ROM, a DVD, a magnetic-optical medium such as a floptical disk, and a ROM, a RAM, or a flash memory.

As described above, according to the embodiments of the present disclosure, the ultra-small IoT device for a smart security window according to an embodiment of the present disclosure may be designed, a trespassing situations may be recognized by applying the signal processing method and the machine learning method using the manufactured ultra-small IoT device, and information and results of recognizing the impact pattern may be provided to the user through the user terminal or a mobile communication terminal. Further, when "intrusion" is detected at the security window, a trespassing situations is minutely classified to determine whether an intrusion occurs more accurately and precisely, and since the self-security system for determining a type of an intrusion by the user himself is implemented, a smart security window minimizing a malfunction rate may be realized.

In addition, the IoT-based security system according to the embodiment provides information related to an trespassing situations to the user through a mobile application, and if it is determined that an intrusion occurs, the IoT-based security system may provide a captured image to the user by controlling the security camera and/or the lighting device through a home network, thereby adaptively coping with various situations.

As set forth above, according to embodiments of the present disclosure, the ultra-small IoT device for improving utilization of space and ease and the trespassing situations analysis system using the same are provided. According to the embodiment, after the acceleration sensor processes measured data and applies the machine learning method, whether an intrusion occurs is automatically determined by analyzing trespassing situations based on various conditions and circumstances, thereby reducing malfunction due to an impact other than an intrusion and preventing an unnecessary alarm.

The IoT-based security system according to the embodiment provides information related to an trespassing situations to the user through a mobile application, and if it is determined that an intrusion occurs, the IoT-based security system may provide a captured image to the user by controlling the security camera and the lighting device through a home network, thereby adaptively coping with an intrusion situation.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. An Internet-of-things (IoT)-based trespassing situations analysis system for a smart security window, the system comprising:
   an ultra-small IoT device attached to a security window and detecting an impact by trespassing situation;
   a station processing a signal obtained from the ultra-small IoT device and analyzing an trespassing situations; and
   a user terminal connected to the station via a network and outputting information related to the trespassing situations through an interface,
   wherein the ultra-small IoT device comprises:
   an acceleration sensor detecting a trespassing situation applied to the security window; and
   an ultra-small IoT controller transmitting 3-axis acceleration data obtained from the acceleration sensor to the station, and
   the station comprises a station controller including a signal processing module processing the 3-axis acceleration data and extracting a feature vector and a classification module generating a learning model on the basis of the feature vector and determining a trespassing situations, and determining whether an intrusion occurs on the basis of the trespassing situations.

2. The system of claim 1, wherein
the signal processing module comprises:
an acceleration signal processing unit obtaining a signal magnitude area (SMA) signal on the basis of the three-axis acceleration data;
a noise canceling unit canceling noise from the SMA signal;
an impact signal by trespassing detecting unit calculating a threshold on the basis of the noise-canceled signal and a predetermined sensitivity α and obtaining an impact signal on the basis of the threshold; and
a feature vector extracting unit extracting a feature vector from the trespassing signal, and
the classification module comprises:
a learning model generating unit generating a learning model related to the trespassing situations on the basis of the extracted feature vector; and
a trespassing situations determining unit determining an trespassing situations on the basis of the learning model.

3. The system of claim 2, wherein
the learning model related to the trespassing situations comprises a trespassing model (P-Model) applied by a hand, a trespassing situation as model (H-Model) applied by a hammer, a model (K-Model) in which a security window is scratched by a knife, and a model (S-Model) in which a security window is shaken by a hand.

4. The system of claim 2, wherein
the user terminal is configured to set a predetermined sensitivity (α) via an interface and transmit a control signal to the station via a network.

5. The system of claim 2, wherein
the feature vector extracting unit extracts the feature vector by calculating an average, a deviation, a root mean square (RMS), a skewness, a kurtosis, and a dominant frequency (DF) of the impact signal by trespassing, and
the learning model generating unit improves accuracy of the trespassing situations analysis by reducing a dimension by applying a principal component analysis (PCA) to the feature vector.

6. The system of claim 1, wherein
the ultra-small IoT device further comprises an ultra-small IoT alarm unit calculating an impact amount by trespassing on the basis of the three-axis acceleration data and outputting LED light or a sound when the impact amount by trespassing is greater than or equal to a threshold.

7. The system of claim 1, wherein
the station further comprises a station alarm unit outputting LED light or a sound when it is determined that an intrusion occurs.

8. The system of claim 1, further comprising:
a security camera or a lighting device connected to the station and the user terminal via a network,
wherein the security camera or the lighting device is automatically controlled by a control signal received from the station according to whether an intrusion occurs or is controlled by a control signal received from the user terminal.

9. An Internet-of-things (IoT)-based trespassing situations analysis method for a smart security window, which is performed by a computer processor, the method comprising:
receiving 3-axis acceleration data from an acceleration sensor attached to the security window;
obtaining a signal magnitude area (SMA) signal on the basis of the 3-axis acceleration data;
canceling noise from the SMA signal;
calculating a threshold on the basis of the noise-canceled SMA signal and a predetermined sensitivity α and obtaining an trespassing signal on the basis of the threshold;
extracting a feature vector from the trespassing signal;
generating a learning model related to the trespassing situations on the basis of the extracted feature vector;
determining the trespassing situations on the basis of the feature vector and the learning model;
determining whether an intrusion occurs on the basis of the trespassing situations; and
transmitting the trespassing situations and information related to the intrusion to a user terminal via a network.

* * * * *